United States Patent Office 3,736,110
Patented May 29, 1973

3,736,110
MONO- AND DICRESYL PHOSPHATE AMINE
RUST INHIBITORS
Ernest H. Owston, Jr., Corona, and Robert L. Dinsmore,
Long Beach, Calif., assignors to Atlantic Richfield
Company, Philadelphia, Pa.
No Drawing. Filed June 24, 1969, Ser. No. 836,170
Int. Cl. C10l 1/26
U.S. Cl. 44—56    3 Claims

ABSTRACT OF THE DISCLOSURE

A rust inhibitor synthesized by reacting cresylic acid with phosphorus pentoxide to form mono- and di-aryl acid phosphates which are then neutralized with an imidazoline, and a process for producing such rust inhibitors is described. The rust inhibitor is useful in gasolines, including gasolines containing t-butyl alcohol.

BACKGROUND OF THE INVENTION

Field of the invention

This invention relates to rust inhibitors and, more particularly, to organic imidazoline salts of mono- and di-cresylic phosphates.

Description of the prior art

Rust inhibitors formed from the reaction of alkyl alcohols with $P_2O_5$ and neutralization of the phosphate with an amine are known. However, to our knowledge, aryl phosphate amines have not been heretofore known to possess rust inhibiting properties. Compounds of this general class and the particular compounds described hereinafter have now been found to possess unexpectedly advantageous rust inhibiting characteristics. Accordingly, it is the object of this invention to provide an improved rust inhibiting composition and a process for producing the same.

SUMMARY OF THE INVENTION

This invention comprises a rust inhibiting composition which is best described in terms of its method of preparation. The composition comprises the reaction product of petroleum cresylic acids with phosphorus pentoxide neutralized by reaction with an organic imidazoline. It is, therefore, the object of this invention to provide a process for producing a rust inhibitor and the product of the process as a rust inhibitor.

DESCRIPTION OF THE PREFERRED EMBODIMENTS

The inventive process comprises, first, reacting petroleum cresylic acids with $P_2O_5$ to form a mixture of mono- and di-aryl acid phosphates and, secondly, neutralizing this product with an imidazoline to form the rust inhibiting composition of the invention.

The term cresylic acid in this application is used in the sense that it is used in the petroleum trade; i.e., the designation for commercial mixtures of phenolic materials boiling in the cresylic acid range. Cresylic acid consists of phenols, cresols, and xylenols in various proportions. Cresylic acid may be derived from petroleum or from coal tar. Petroleum derived cresylic acid is preferred for this invention, however. A typical cresylic acid composition, useful in this invention, contains about 10 percent phenol, 30 percent cresols, 40 percent xylenols, and about 3 percent higher phenols. This is not, however, a critical ratio and the cresylic acid useful in this invention may be defined simply as containing a major portion of cresols and xylenols with minor proportions of higher and lower molecular weight phenolic compounds.

The cresylic acid is dry distilled and reacted, preferably, in a solvent such as toluene, with $P_2O_5$. The reaction may be carried out at room temperatures, and temperature does not appear to be a critical variable. $P_2O_5$ in a proportion to provide a mixture of mono- and di-aryl acid phosphates is used. The amount of $P_2O_5$, therefore, is calculated according to the composition of the particular cresylic acid used in the process.

The acid phosphate, which is insoluble in the toluene solvent, is then neutralized with an organic imidazoline. Amines of this type having molecular weights from about 270 to about 400 are preferred. Typical of such amines is a commercially available amine described as Geigy amine O, which is an imidazoline of molecular weight 355 having the following formula:

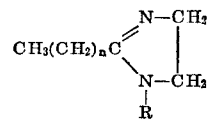

in which $n$ is at least about 10 and wherein R is a $C_6$ to $C_{16}$, averaging about $C_{10}$, alkyl, aryl, or aralkyl group.

In a specific embodiment, ¼ mole (28.6 gms.) of cresylic acid containing about 10 percent phenol, 30 percent cresols, 40 percent xylenols, and 3 percent higher phenols, was dissolved in 500 millilitres of toluene and reacted, by stirring at room temperature, with ½ mole $P_2O_5$ to give a reaction mixture comprising mono- and di-aryl phosphates. The cresylic acid was derived from California base petroleum and was dry distilled. The mono- and di-aryl phosphate was neutralized with ¼ mole (+5% excess) Geigy Amine O described previously.

The rust inhibiting effect of the product of the above process was tested in reagent toluene. ASTM 1020 cold rolled steel strips prepolished with a 100 grit Carborundum belt sander and rinsed in acetone were the test samples. The metal strips, after preparation, were placed in test bottles and allowed to soak for approximately 16 hours completely immersed. At the end of 16 hours, 10 mls. of HBr acidified deionized water at pH 3 was added to 90 mls. of test hydrocarbon, the starting volume, and shaken for 15 seconds. The 8 oz. square bottles in which the tests were run were capped with aluminum foil lined lids and laid horizontally such that the strip was immersed in the test fuel and water, crossing the water interface. The strips were rated, shaken 15 seconds, and returned to the horizontal position at the desired intervals, beginning after 30 minutes. A control, which contained no additives, was compared with toluene and the test feed containing the inventive additive in the ratio of 6 pounds per thousand barrels were compared. Some 50 commercial additives were compared using the same procedure. The additive of this invention, cresylic "Amine O" phosphate, was comparable with the 5 best additives, at a ratio of 6 pounds per thousand barrels. The results of these tests are given in Table I.

TABLE I

[Evaluations of corrosion inhibitor additives—static rust test method—10% HBr acidified deionized water in 90% Baker analyzed toluene reagent]

| Additive identification | Total conc., lbs/Mbbl. | Estimation of percent of rusted area on 1,020 cold rolled steel specimen after 72 hrs. fuel-water contact | |
|---|---|---|---|
| | | Fuel phase | Water phase |
| No inhibitor | 0 | [1] 60.8 | [1] 87.0 |
| Amyl phosphate-Armour Duomene T, reacted | 6 | 20–25 | 5–6 |
| Amyl phosphate-Armour Duomene T, reacted, at 6 lbs/Mbbl. plus Geigy Amine O at 3 lbs./Mbbl | 9 | Trace–1.0 | 2–3 |
| Cresylic "Amine O" phosphate | 6 | 2–3 | 2–3 |
| Naphthenic Acid plus— | | | |
| Amine C | 6 | 70–75 | 50–60 |
| Amine O | 6 | 70–75 | 50–60 |
| Amine S | 6 | 25–50 | 15–20 |
| Atlantic ARI-1 | 6 | 3–5 | 5–6 |
| Atlantic ARI-1 at 3 lbs./Mbbl. plus Geigy Amine O at 3 lbs./Mbbl | 6 | Trace | 3–4 |
| Geigy Sarkosyl L | 6 | 1–5 | 5–10 |
| Geigy Sarkosyl L at 3 lbs./Mbbl. plus Geigy Amine O at 3 lbs./Mbbl | 6 | Trace | 1–3 |
| Geigy Sarkosyl O | 6 | Trace | 5–10 |
| Geigy Sarkosyl O at 3 lbs./Mbbl. plus Geigy Amine O at 3 lbs./Mbbl | 6 | Trace | 1–3 |
| Geigy Sarkosyl O at 4.5 lbs./Mbbl. plus Geigy Amine O at 1.5 lbs./Mbbl | 6 | 2–3 | 3–5 |
| Geigy Sarkosyl S | 6 | Trace | 5–10 |
| Geigy Sarkosyl S at 3 lbs./Mbbl. plus Geigy Amine O at 3 lbs./Mbbl | 6 | Trace | 3–5 |
| Lubrizol 541 | 6 | Trace | 5–10 |
| Lubrizol 850 | 6 | 3–4 | 5–6 |
| Tetrolite Tolad 244 | 6 | Trace | 20–25 |

[1] Average.

A second test was made using unleaded premium base gasoline, without corrosion inhibitor. Out of 13 of the best additives previously tested, using the same procedure as before except substituting gasoline in place of toluene, the additive of this invention was rated as one of the best three for rust protection in both fuel and water phases. The results of this test are given in Table II.

TABLE II

[Evaluations of corrosion inhibitor additives—static rust test method—10% HBr acidified deionized water in 90% unleaded premium base gasoline [1]]

| Additive identification | Total con., lbs./Mbbl. | Estimation of percent of rusted area on 1,020 cold rolled steel specimen after 96 hrs. fuel-water contact | |
|---|---|---|---|
| | | Fuel Phase | Water Phase |
| No inhibitor | 0 | 15–20 | 75–85 |
| Cresylic "Amine O" phosphate | 6 | Trace–1.0 | 3–5 |
| Atlantic ARI-1 | 6 | 3–5 | 8–10 |
| Atlantic ARI-1 at 3 lbs./Mbbl. plus Geigy Amine O at 3 lbs./Mbbl | 6 | Trace | 4–6 |
| Geigy Sarkosyl L | 6 | Trace | 3–5 |
| Geigy Sarkosyl L at 3 lbs./Mbbl. plus Geigy Amine O at 3 lbs./Mbbl | 6 | Trace | Trace–1.0 |
| Geigy Sarkosyl O | 6 | 1–2 | 6–8 |
| Geigy Sarkosyl O at 3 lbs./Mbbl. plus Geigy Amine O at 3 lbs./Mbbl | 6 | 0 | 3–5 |
| Geigy Sarkosyl S at 3 lbs./Mbbl. plus Geigy Amine O at 3 lbs./Mbbl | 6 | Trace–1.0 | 2–4 |
| Lubrizol 541 | 6 | 2–4 | 10–12 |
| Lubrizol 850 | 6 | Trace–1.0 | 6–8 |
| Tretolite Tolad 244 | 6 | 8–10 | 25–30 |

[1] The gasoline base is without inhibitor additives but includes metal deactivator and antiozidant.

A static rust test was run using a fuel containing ARCONOL (Oxirane tertiary butyl alcohol). Comparative results are given in Table III. It will be noted that, quite unexpectedly, the corrosion inhibitor of this invention is highly effective even in the more corrosive gasoline-tertiary butyl alcohol composition.

TABLE III

[Evaluation of corrosion inhibitor—static rust test method—10% HBr acidified deionized water in premium base gasoline [1] to determine ARCONOL effect]

| Additive identification | Estimation of percent of rusted area on 1,020 cold rolled steel specimen after 48 hrs. fuel-water contact | |
|---|---|---|
| | Fuel phase | Water phase |
| No inhibitor | 25–30 | 50–60 |
| Cresylic "Amine O" phosphate at 6 lbs./Mbbl. | 5–6 | 5–10 |
| No inhibitor [2] | 25–30 | 65–70 |
| Cresylic "Amine O" phosphate [2] at 6 lbs./Mbbl. | 5–6 | 20–25 |

[1] The gasoline base is without inhibitor additives but includes meta deactivator antioxidant and leaded.
[2] Contains ARCONOL (oxirane tertiary butyl alcohol) with 2.0% water content in the fuel at 10.0 volume percent.

ASTM Rust Test D-665-60, modified to run 16 hours, rather than the usual 4 hours, was run to compare the effect of the inventive additive under dynamic conditions. As the data in Table IV show, the inventive additive is highly effective and is comparable or superior to the best commercial additives.

TABLE IV

[Evaluations of corrosion inhibitor additives—ASTM D-665-60 rust test method [1]—regular grade base gasoline [2] in the presence of deionized water]

| Additive identification | Conc., lbs./Mbbl. | Rust ratings [3] |
|---|---|---|
| No inhibitor | 0 | E |
| Cresylic "Amine O" phosphate | 6 | A |
| Atlantic ARI-1 | 6 | A |
| Atlantic ARI-1 at 3 lbs./Mbbl. plus Geigy Amine O at 3 lbs./Mbbl | 6 | A |
| Geigy Sarkosyl L at 3 lbs./Mbbl. plus Geigy Amine O at 3 lbs./Mbbl | 6 | B+ |
| Geigy Sarkosyl O at 3 lbs./Mbbl. plus Geigy Amine O at 3 lbs./Mbbl | 6 | B |
| Lubrizol 541 | 6 | A |

[1] This test modified to run 16 hours at room temperature (approximately 77° F.) and is a dynamic rust test.
[2] The gasoline base is without inhibitor additives but includes 5.0 volume percent tertiary butyl alcohol (with impurities including water), metal deactivator and antioxidant and leaded.
[3] Rust ratings as follows:
    A—no visible rust.
    B+—<5.0% rust.
    B—5–25% rust.
    E—75–100% rust.

As will be apparent from the foregoing, the compositions of this invention may be developed using cresylic acid phosphates neutralized with a large variety of imidazolines. Variations and substitutions of imidazolines and other amines and variations in the process may be made, within reasonable limits, without departing from the spirit and scope of the invention, as defined in the claims which follow.

We claim:

1. Rust inhibiting compositions prepared by a process comprising the steps of, first, reacting cresylic acid with phosphorus pentoxide in an amount to form a mixture of mono- and di-aryl phosphates and, secondly, at least neutralizing said mono- and di-aryl phosphates with an imidazoline having a molecular weight of between 150 and 400 and containing at least one $C_{10}$ to $C_{30}$ alkyl group.

2. The product of claim 1 wherein the imidazoline is of the following formula:

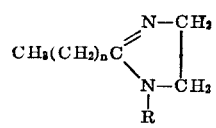

wherein $n$ is from 10 to 30 and R is a $C_6$ to $C_{16}$ alkyl, aryl or aralkyl group.

3. A motor fuel comprising gasoline containing tertiary butyl alcohol and the reaction product of cresylic acid, phosphorus pentoxide and an imidazoline of the following formula:

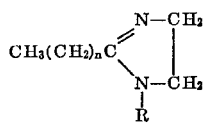

wherein $n$ is from 10 to 20 and R is a $C_6$ to $C_{16}$ alkyl, aryl or aralkyl group.

References Cited

UNITED STATES PATENTS

| | | | |
|---|---|---|---|
| 1,907,309 | 5/1933 | Schaak, Jr. | 44—56 |
| 2,080,299 | 5/1937 | Benning et al. | 44—69 P |
| 2,959,473 | 11/1960 | Andress, Jr. | 44—69 P |
| 2,413,852 | 1/1947 | Turner | 252—389 |
| 2,728,643 | 12/1955 | Vaughn | 252—389 |
| 2,728,644 | 12/1955 | Vaughn | 252—389 |
| 2,728,645 | 12/1955 | Vaughn | 252—389 |
| 2,863,746 | 12/1958 | Cantrell et al. | 252—389 |
| 2,728,728 | 12/1955 | Vaughn | 252—389 |
| 2,824,068 | 2/1958 | Leland et al. | 252—389 |
| 3,079,339 | 2/1963 | Cantrell et al. | 252—389 |
| 3,197,496 | 7/1965 | Le Suer | 252—389 |

OTHER REFERENCES

Geigy Industrial Chemicals, page 12.

DANIEL E. WYMAN, Primary Examiner
Y. H. SMITH, Assistant Examiner

U.S. Cl. X.R.

44—DIG. 63; 252—389